United States Patent
Poland et al.

(10) Patent No.: US 7,557,339 B2
(45) Date of Patent: Jul. 7, 2009

(54) OPTICAL POSITION SENSOR

(75) Inventors: Stephen H. Poland, Blacksburg, VA (US); Stephen E. Hester, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 31 days.

(21) Appl. No.: 11/373,649

(22) Filed: Mar. 10, 2006

(65) Prior Publication Data

US 2007/0012872 A1 Jan. 18, 2007

Related U.S. Application Data

(60) Provisional application No. 60/660,700, filed on Mar. 12, 2005.

(51) Int. Cl.
*E21B 47/12* (2006.01)
(52) U.S. Cl. .............................. 250/227.14; 250/227.16; 73/156; 166/250.1
(58) Field of Classification Search ............ 250/227.25, 250/227.14–227.19; 73/156; 166/250.01
See application file for complete search history.

(56) References Cited

U.S. PATENT DOCUMENTS

| 5,592,149 | A * | 1/1997 | Alizi | 340/550 |
| 6,828,547 | B2 * | 12/2004 | Tubel | 250/227.14 |
| 2004/0112595 | A1 * | 6/2004 | Bostick et al. | 166/250.01 |
| 2005/0034857 | A1 * | 2/2005 | Defretin | 166/250.01 |
| 2005/0179645 | A1 * | 8/2005 | Lin | 345/156 |
| 2007/0251687 | A1 * | 11/2007 | Martinez et al. | 166/250.1 |

* cited by examiner

*Primary Examiner*—Georgia Y Epps
*Assistant Examiner*—Tony Ko
(74) *Attorney, Agent, or Firm*—Cantor Colburn LLP

(57) ABSTRACT

An optical positioning monitoring system is disclosed. The system has an optical sensing member disposed on a wellbore pipe, such as the tubing or production casing. When a tool comprising an actuating member acts on the optical sensing member, an optical signal is returnable from the optical sensing member indicating the position of the tool. The optical sensing member may include an optical fiber and/or any known optical sensors. The actuating member can be a force applicator or a heat applicator. Alternatively, the optical sensing member can be located on the tool and the actuating member can be located on the tubing or production casing.

19 Claims, 3 Drawing Sheets

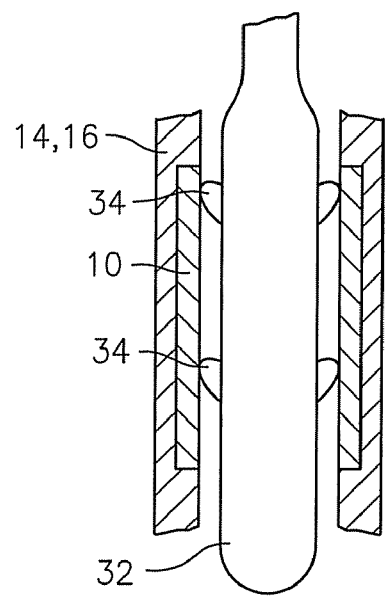 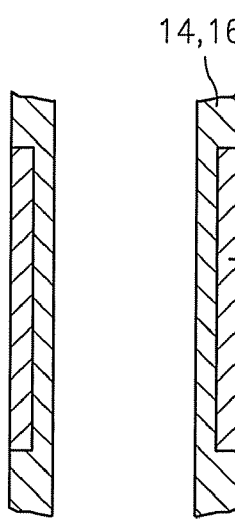 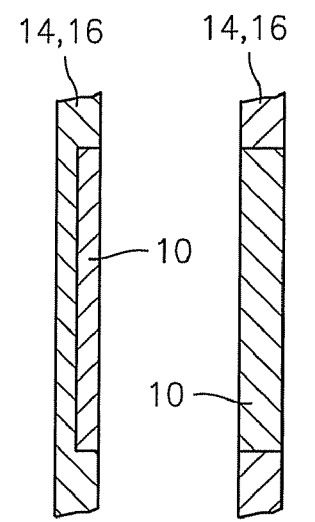
FIG. 2A    FIG. 2B    FIG. 2C
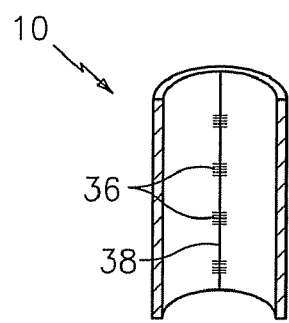 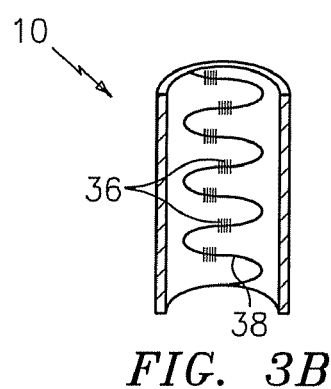 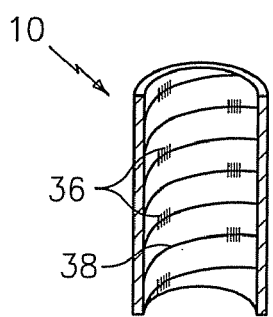
FIG. 3A    FIG. 3B    FIG. 3C

OPTICAL POSITION SENSOR

CROSS REFERENCE TO RELATED APPLICATIONS

The present application claims the benefit of U.S. Provisional Patent Application No. 60/660,700 filed on Mar. 12, 2005, the entire contents of which are specifically incorporated herein by reference in its entirety.

BACKGROUND

Optical Fibers have become the communication medium of choice for long distance communication due to their excellent light transmission characteristics over long distances and the ability to fabricate such fibers in lengths of many kilometers. The transmitted light can also power the sensors, thus obviating the need for lengthy electrical wires. This is particularly important in the petroleum and gas industry, where strings of electronic sensors are used in wells to monitor downhole conditions.

As a result, in the petroleum and gas industry, passive fiber optic sensors are used to obtain various downhole measurements, such as, pressure or temperature. A string of optical fibers within a fiber optic system is used to communicate information from wells being drilled, as well as from completed wells. For example, a series of weakly reflecting fiber Bragg gratings (FBGs) may be written into a length of optical fiber, such as by photoetching. As is known in the art, the distribution of light wavelengths reflected from an FBG is influenced by the temperature and strain of the device to which the FBG is attached. An optical signal is sent down the fiber, which is reflected back to a receiver and analyzed to characterize the length of optical fiber. Using this information, downhole measurements may be obtained.

Due to the depth of typical oil and gas wells, one or more of the optical sensors are typically spliced into a length of optical transmission fiber that extends from the surface to the desired depths. As such, it is desirable to take measurements at various depths of the well. Additionally, while drilling optical sensors can be added to the monitoring system for adequate coverage of the well.

For some applications, it is important to determine the precise location of a tool or the open/closed status of a valve with optical sensors, which heretofore has not been disclosed in the art.

SUMMARY OF THE INVENTION

The above described and other problems are overcome by the present optical positioning monitoring system, which comprises an optical sensing member disposed on a wellbore pipe, such as the tubing or production casing. When a tool comprising an actuating member acts on the optical sensing member, an optical signal is returnable from the optical sensing member indicating the position of the tool. The optical sensing member may include an optical fiber and/or any known optical sensors. The actuating member can be a strain, pressure, force, temperature, electric and/or magnetic field applicator.

Alternatively, the optical sensing member can be located on the tool and the actuating member can be located on the tubing or production casing.

BRIEF DESCRIPTION OF THE DRAWINGS

In the accompanying drawings, which form a part of the specification and are to be read in conjunction therewith and in which like reference numerals are used to indicate like parts in the various views:

FIGS. 2A, 2B and 2C are expanded partial cross-sectional views of different configurations of the optical position sensor;

FIGS. 3A, 3B and 3C are cross-sectional view of the different embodiments of the optical sensors.

DETAILED DESCRIPTION

As illustrated in the accompanying drawings as discussed in detail below, the present disclosure relates to an optical position sensor for measuring the location or position of a downhole tools or oilfield equipment such as packers, fishing tools, perforation gun, logging tools, sliding sleeves, inflatable packers, etc., or whether that a surface or subsurface valve is open or closed. The present optical position sensor can determine the linear location of the tool relative to the wellhead or the ground surface and the angular location within the wellbore.

The present optical position sensor may utilize known optical sensors, including but not limited to FBGs, extrinsic Fabry-Perot interferometers (EFPI), intrinsic Fabry-Perot interferometers (IFPI), Mach-Zehnder inferometers, Sagnac interferometers, Michelson type sensors, backscatter, etc., and known sensing techniques including but not limited to optical frequency domain reflectometry (OFDE), optical time domain reflectometry (OTDR), optical coherence domain reflectometry (OCDR) and spectral interrogation. The sensors can be distributed throughout the optical fiber and are distinct or spatially separated from each other, such as distributed discrete sensors (DDxS), which include distributed discrete temperature sensors (DDTS), distributes discrete strain sensors (DDSS) or distributed discrete pressure sensors (DDPS). Alternatively, the sensors can be distributed throughout the optical fiber and are continuous, i.e., not spatially separated from each other, such as distributed temperature sensors (DTS) or distributed strain sensors (DSS).

Additionally, the present optical position sensor can also utilize optical fibers without sensors, i.e., using Raleigh backscattering as described in U.S. Pat. No. 6,545,760, or Brillouin back scattering as disclosed in U.S. Pat. No. 5,515,192, to ascertain the location of the tools. The present optical position sensor can also utilize the Raman effect for sensing changes temperature on the optical fiber by measuring the changed wavelength of emitted light as describes in U.S. Pat. No. 5,765,948. These references are incorporated by reference in their entireties.

Figure 1:
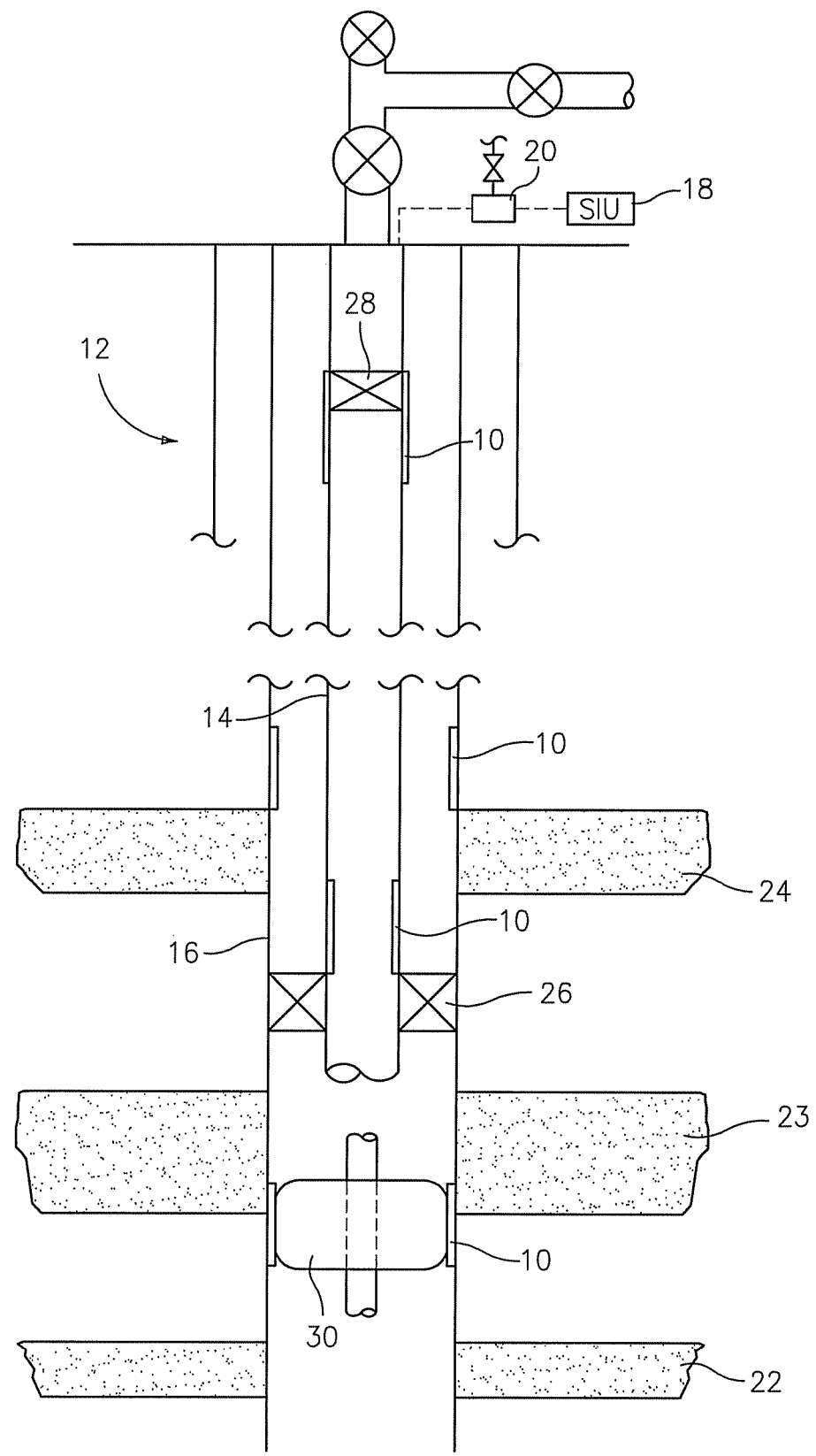
FIG. 1 is a schematic representation of an exemplary well showing a plurality of optical position sensors with certain details omitted for clarity.

Referring to FIG. 1 and in accordance to one exemplary embodiment, at least one position sensor 10 is disposed in wellbore 12. An unlimited number of position sensors 10 can be deployed depending on the particular application or need. Position sensors 10 can be placed inside tubing 14, outside tubing 14, on production casing 16 or on any location within wellbore 12. Position sensors 10 are connected to surface instrumentation unit (SIU) 18 via optical cable(s) (not shown). Optionally, the optical cable is also connected to vent box 20 to relieve potential pressure build up with in the cable.

Suitable optical cables include single mode fibers, multimode fibers, polarization maintaining fibers, plastic fibers and coreless fibers.

In another exemplary embodiment, position sensor 10 is located at convenient locations in the wellbore, such as proximate to hydrocarbon production zones 22, 23, 24, packer 26, subsurface safety or shutoff valve 28, inflatable packer 30, and/or the bottom of the hole. The locations of these elements are important in the management, operation and safety of oil and gas wells, water/gas injection wells for secondary or tertiary recovery, geothermal wells, etc.

Referring to FIG. 2A, position sensor 10 can be a tubular sleeve disposed within a section of pipe, such as tubing 14 or production casing 16. As tool 32 is lowered into wellbore 12, one or more arms 34 come into contact with position sensor 10. Arms 34 can be rigidly affixed to tool 32, or arms 34 can be flexible or spring loaded. Alternatively, arms 34 can be folded toward the body of tool 32 for easy insertion into the wellbore, and are extended when tool 32 reached the desired location. Arms 34 essentially are forced applicators, and when arms 34 contact sensor 10 they apply a force to sensors 36 that are disposed on sensor 1- as illustrated in FIGS. 3A-3C. Sensors 36 are connected to each other by optical fiber 38. As is known in the art, the applied force stresses sensors 36 and when interrogated by an optical signal, the applied stress alters the signal returned to SIU 18 indicating an accurate position of tool 32.

In an alternative exemplary embodiment, arms 34 generate heat for example by embedded heating elements. When arms 34 comes at least proximate to position sensor 10 the heat changes the interrogating optical signal and SIU 18 can detect this change in the returned signal to obtain an accurate position of tool 32. One advantage of using a heat applicator is that physical contact between arms 34 and position sensor 10 is unnecessary thereby reducing wear and tear on the sensors.

FBGs, EFPI, an IFPI are some of the known optical sensors that react to stress/applied force or changes temperature and, thus, are the preferred sensors. More preferably, FBGs are used due to the ease in manufacturing of these gratings by photoetching. Other sensors such as silicon sensors that are optically sensitive to heat can be used. Any optical sensors that respond to stress/strain or temperature are suitable, including those described above. As illustrated in FIGS. 3A-3C, sensors 36 are DDxS sensors, e.g., DDTS, DDPS and/or DDSS sensors. However, these sensors can also be DTS or DSS type sensors discusses above.

In another exemplary embodiment, sensors 36 are omitted and only optical fibers 38 are present in optical sensor 10. The signal returnable to SIU 18 are Rayleigh backscattering signals that can be processed to pinpoint the location of tool 32, as discussed in the '760 patent previously incorporated above. Likewise, Brillouin backscattering and Raman effect can also be used to locate tool 32.

In the exemplary embodiment shown in FIG. 3A, sensors 36 and fiber 38 are arranged longitudinally relative to the wellbore and longitudinal location of tool 32 can be ascertained. In the exemplary embodiment shown in FIG. 3B, sensors 36 and fiber 38 are arranged in a serpentine or sinusoidal fashion and the angular position of tool 32 can also be ascertained. Likewise, sensors 36 and fiber 38 can be arranged in a helical fashion to provide both longitudinal and angular locations of tool 32.

Alternatively, as shown in FIG. 2B position sensor 10 can be positioned on the outside of the pipe to fix the position of the tools that are lowered into the annulus between tubing 14 and casing 16. In this case, sensors 36 and fiber 38 are arranged on the outside surface of position sensor 10. Additionally, sensor 36 and fiber 38 are arranged on both the inside and outside surfaces of position sensor 10, as illustrated in FIG. 2C. In one example, one entire section of tubing or casing can be converted into position sensor 10. The locations of position sensors 10 can be pre-determined by calibration for example by OTDR, Rayleigh scattering or other known techniques and these positions can be stored in SIU 18's memory.

Figure 4:
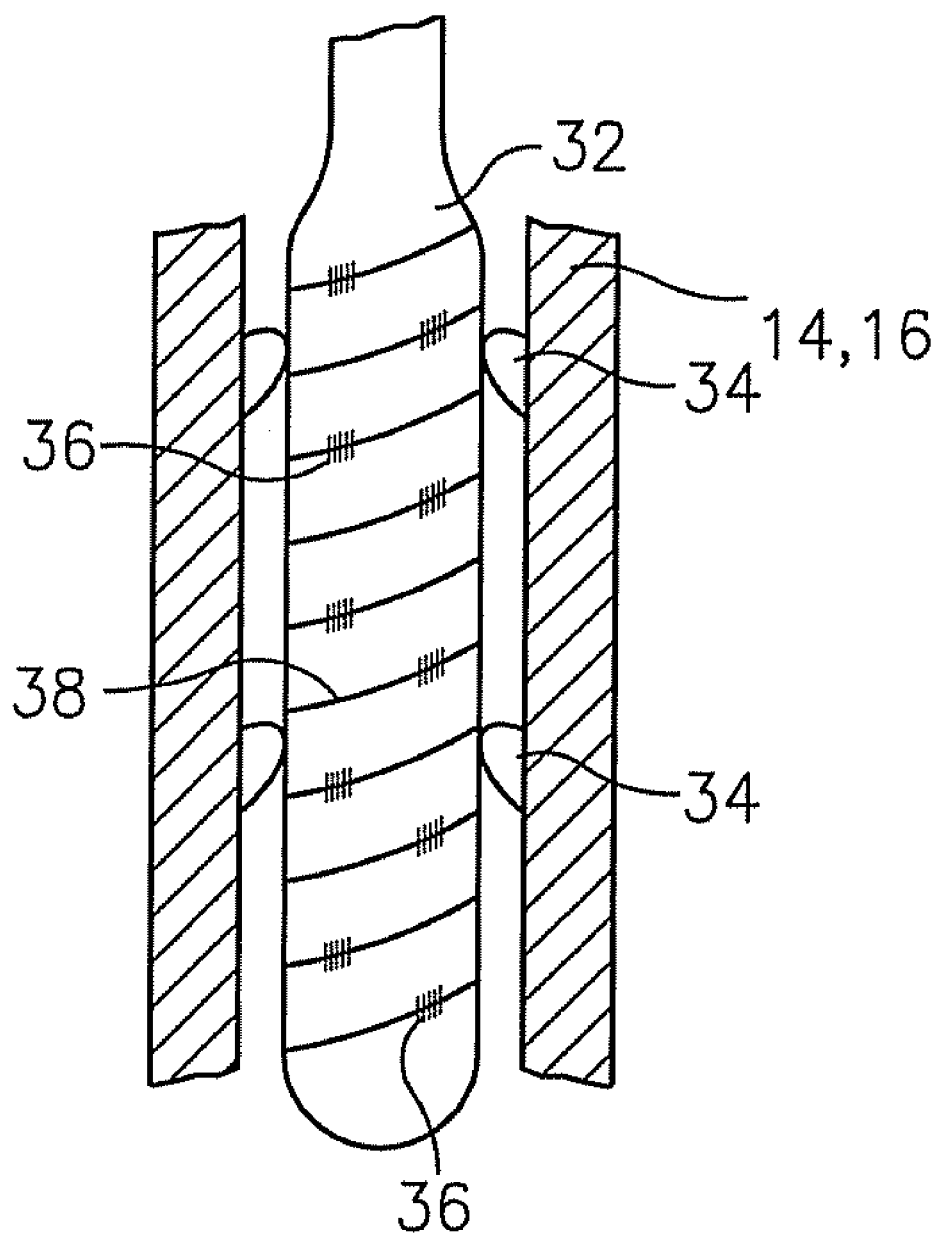
FIG. 4 is an expanded partial cross-sectional view of another embodiment of the optical position sensor.

In another exemplary embodiment illustrated in FIG. 4, position sensor 10 is arranged on tool 32 and arms 34 are affixed on either tubing 14 or casing 16. The fixed positions of arms 34 can be pre-determined by another optical tool or by standard logging tools. When tool 32 / position sensor 10 contact arms 34, the returned optical signal to SIU 18 would indicate the position of the tool similar to the process described above. Arms 34 can be disposed on the inside or outside of tubing 14 or on casing 16, depending on the particular application. Sensors 36 and/or fiber 38 can be arranged in a helical fashion as shown to provide longitudinal and angular position of tool 32, or in a sinusoidal or linear fashion similar to those shown in FIGS. 3A and 3B. One advantage of this embodiment is that the optical cable-connecting sensor 10 to SIU 18 or a mobile SIU can be lowered along with tool 32.

The precise location of the production zones is vitally important to properly perforating the wellbore for production. As known in oil and gas production, a production zone may comprise a gas stratum on top of an oil stratum and/or a water stratum. Perforating too low can cause water to flood the well and perhaps adversely affect the porosity and permeability of formation rocks. Perforating too close to the interface between the strata can cause water to "cone" or finger into the oil stratum or oil to "cone" or finger into the gas stratum thereby reducing the ultimate hydrocarbon recovery from the well. The perforating tool or gun is typically hung from a long tube or wire. The tube and wire can stretch under their own weight and the weight of the tool, and the thermal expansion caused by heat in the wellbore can also stretch them. The actual position the tool can be accurately recalibrated by presently described position sensor 10.

Additionally, it is very useful to know whether a valve, such as a surface valve or a subsurface safety valve 28, is open or closed. Subsurface safety valves are designed to provide emergency fail-safe closure to stop the flow from a wellbore if the surface valves or the wellhead are damaged or inoperable. Subsurface safety valves are essential in offshore wells or in wells that produce hazardous gases, such as $H_2S$. In normal operation, subsurface safety valves are open to allow flow of produced fluids, but in an emergency automatically closes to stop the flow. Typically, the subsurface safety valve closes when the flow rate exceeds a predetermined value. These valves can be controlled hydraulically from the surface or are designed to operate without human intervention. Typically, the closure mechanism is a rotating ball or a hinged flapper. The ball valve comprises a sphere with a large hole through it. When the hole is aligned with the direction of flow the valve is open, and when the hole is turned 90° the valve is closed. Flapper valve comprises a hinged, biased flapper that is held open (or in the down position) by a movable flow tube. When the tube is moved upward the flapper closes to shut the valve. It is desirable to be able to periodically test these valves to determine whether they are operational. As described above, position sensor 10 of the present invention can detect the angular position of a ball valve or the longitudinal location of the flapper valve. Subsurface safety valves are commercially available from Baker Oils Tools, among other oil services companies.

It is also useful to know whether inflatable packer 30 deployed at the correct location. Inflatable packers when deflated are sufficiently small to fit through the tubing and enter the larger casing, as shown in FIG. 1. After reaching the casing below the tubing, it can be inflated to isolated one production zone from another to affect selective production. After being inflated, inflatable packer 30 exerts pressure on position sensor 10 to confirm proper deployment. Inflatable packers are fully discussed in "Inflatable Packing Element with Separator Device" by G. McKenzie available at http://os.pennnet.com//Articles/Article_Display.cfm?Section=ARCHI&ARTICLE_ID=159792&VERSION_NUM=1. This reference is incorporated herein by reference in its entirety.

As used herein, tool 32 can be any tool or equipment used downhole in wellbore 12 or on the wellhead. Non-limiting examples of tool 32 include, but are not limited to fishing tools, perforating guns, subsurface safety valves, sliding sleeves, packers, inflatable packers, etc.

While the present optical position sensor is described in terms of exemplary embodiments, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. An optical positioning monitoring system comprising:
   a first member and a second member, wherein the first and second members are movable relative to each other,
   an optical fiber sensing member disposed at one of the first or second member; and
   an actuating member disposed at the other one of the first or second member, the actuating member configured to at least one of (i) contact the optical fiber sensing member and (ii) change a temperature of the optical fiber sensing member at a location along a length of an optical fiber to cause the optical fiber sensing member to return an optical signal indicating the position of the actuating member along the length of the optical fiber.

2. The optical positioning monitoring system of claim 1, wherein the optical fiber sensing member comprises an optical fiber.

3. The optical positioning monitoring system of claim 2, wherein the returnable signal is Rayleigh scattering signal, Brillouin scattering effect or Raman effect.

4. The optical positioning monitoring system of claim 2, wherein the optical fiber sensing member further comprises at least one optical sensor.

5. The optical positioning monitoring system of claim 4, wherein the returnable signal is processed by OFDR, OTDR or OCDR.

6. The optical positioning monitoring system of claim 4, wherein the sensor comprises Bragg gratings, EFPI or IFPI.

7. The optical positioning monitoring system of claim 1, wherein the optical fiber sensing member is arranged in a linear fashion.

8. The optical positioning monitoring system of claim 1, wherein the optical fiber sensing member is arranged in a fashion including a linear component.

9. The optical positioning monitoring system of claim 8, wherein the arrangement further includes an angular component.

10. The optical positioning monitoring system of claim 1, wherein the first member comprises a wellbore pipe and the optical fiber sensing member is disposed on the wellbore pipe.

11. The optical positioning monitoring system of claim 10, wherein the second member comprises a tool and the actuating member is disposed on the tool.

12. The optical positioning monitoring system of claim 1, wherein the first member comprises a tool and the optical fiber sensing member is disposed on the tool.

13. The optical positioning monitoring system of claim 12, wherein the second member comprises a wellbore pipe and the actuating member is disposed on the wellbore pipe.

14. The optical positioning monitoring system of claim 10 or 13, wherein the wellbore pipe comprises a tubing or a production casing.

15. The optical positioning monitoring system of claim 11 or 12, wherein the tool comprises an element insertable in a wellbore pipe.

16. The optical positioning monitoring system of claim 1, wherein the actuating member comprises a force applicator.

17. The optical positioning monitoring system of claim 16, wherein the force applicator contacts the optical fiber sensing member to cause the optical signal indicating the position of the actuating member.

18. The optical positioning monitoring system of claim 1, wherein the actuating member comprises a heat applicator.

19. The optical positioning monitoring system of claim 18, wherein the heat applicator is brought proximate to the optical fiber sensing member to cause the optical signal indicating the position of the actuating member.

* * * * *